(12) United States Patent
Isogami et al.

(10) Patent No.: US 8,801,923 B2
(45) Date of Patent: Aug. 12, 2014

(54) WASTEWATER TREATMENT APPARATUS

(75) Inventors: Hisashi Isogami, Tokyo (JP); Satoshi Miyabayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 641 days.

(21) Appl. No.: 12/971,062

(22) Filed: Dec. 17, 2010

(65) Prior Publication Data

US 2011/0147291 A1 Jun. 23, 2011

(30) Foreign Application Priority Data

Dec. 18, 2009 (JP) ................................ 2009-287964

(51) Int. Cl.
*C02F 1/48* (2006.01)
*C02F 1/52* (2006.01)
*B01D 21/01* (2006.01)
*B03C 1/01* (2006.01)

(52) U.S. Cl.
CPC . *C02F 1/488* (2013.01); *C02F 1/52* (2013.01); *B01D 21/01* (2013.01); *B03C 1/01* (2013.01)
USPC ........... 210/181; 210/201; 210/222; 210/223; 210/243; 210/259

(58) Field of Classification Search
CPC ............. C02F 1/48; C02F 1/52; B01D 21/01; B03C 1/01
USPC ......... 210/175, 201, 222, 243, 259, 695, 223, 210/177, 195.1, 199, 206, 181; 204/660, 204/666
See application file for complete search history.

(56) References Cited

U.S. PATENT DOCUMENTS 5,944,986 A   8/1999  Saho et al.
7,410,573 B2 * 8/2008  Saho et al. .................... 210/206

FOREIGN PATENT DOCUMENTS

| CN | 2651237 Y | 10/2004 |
| EP | 0 931 593 B1 | 7/2003 |
| EP | 1676818 A1 * | 7/2006 |
| JP | 11-57309 A | 3/1999 |
| JP | 11-57310 A | 3/1999 |
| JP | 11-123399 | 5/1999 |
| JP | 11-207399 | 8/1999 |
| JP | 2000-42316 A | 2/2000 |
| JP | 2001-170404 A | 6/2001 |

OTHER PUBLICATIONS

Machine Translation of JP 11-057309, dated Mar. 2, 1999.*

(Continued)

*Primary Examiner* — David A Reifsnyder
(74) *Attorney, Agent, or Firm* — Antonelli, Terry, Stout & Kraus, LLP.

(57) ABSTRACT

A wastewater treatment apparatus that obtains treated water by adding a flocculant and magnetic powder to wastewater accumulated in a tank to thereby generate flocculated magnetic flocs, and recovering the magnetic flocs by means of a magnetic force to thereby remove the magnetic flocs from the wastewater, comprising:
a magnetic flocs treatment device which treats the recovered magnetic flocs and which comprises a high pressure pump and a magnetic separation portion;
wherein the magnetic separation portion has a structure in which fluid piping is arranged at a magnetic field generating portion, and magnetic powder in the magnetic flocs is recovered by using the high pressure pump to pump the recovered magnetic flocs to the fluid piping of the magnetic separation portion, and causing the magnetic powder in the magnetic flocs to attach to the fluid piping by means of a magnetic force of the magnetic field generating portion.

8 Claims, 5 Drawing Sheets

(56) References Cited

OTHER PUBLICATIONS

Mexican Office Action of Appln. No. MX/a/2010/013997 with English translation.

Letter of Mr. Hu dated Mar. 9, 2012 in English submitted to the Canadian Intellectual Property Office.

JP office action of Appln. No. 2009-287964 dated Jan. 4, 2013 with a partial English translation.

* cited by examiner

WASTEWATER TREATMENT APPARATUS

BACKGROUND OF THE INVENTION

1. Field of the Invention

The present invention relates to a wastewater treatment apparatus, and more particularly to a wastewater treatment apparatus that treats wastewater by flocculation and magnetic separation by adding a flocculant and magnetic powder to the wastewater.

2. Description of the Related Art

A water treatment method that uses a flocculation and magnetic separation system obtains treated water by adding a flocculant and magnetic powder to wastewater that is the object of treatment, generating flocculated flocs (hereunder, referred to as "magnetic flocs") by agitating the resulting mixture, and recovering the magnetic flocs using a magnetic force produced by a magnetic separation apparatus.

According to this method, magnetic flocs that include magnetic powder are recovered, and it is necessary to dispose of the recovered magnetic flocs as industrial waste. Consequently, the cost of supplying magnetic powder and the cost of disposing of the recovered flocs as industrial waste lead to an increase in running costs.

Technology for solving the foregoing problem is known, as disclosed in Japanese Patent Application Laid-Open No. 11-123399 and Japanese Patent Application Laid-Open No. 11-207399, in which sludge containing magnetic powder is decomposed by a hydrothermal reaction and the volume of sludge is reduced.

According to the wastewater treatment apparatuses disclosed in Japanese Patent Application Laid-Open Nos. 11-123399 and 11-207399, sewage is purified by flocculation and magnetic separation using a magnetic separation apparatus, sludge that is generated at that time is hydrothermally treated at a high temperature and a high pressure, and magnetic powder is recovered by magnetic separation in a high-temperature and high-pressure line.

However, according to the wastewater treatment apparatuses disclosed in Japanese Patent Application Laid-Open Nos. 11-123399 and 11-207399, there has been the problem that in order to obtain sufficient floc decomposition performance when subjecting sludge to hydrothermal treatment at a high temperature and a high pressure, not only is a significant amount of energy required, but the structure of the hydrothermal apparatus used for the floc decomposition process also becomes complex. In this connection, according to Japanese Patent Application Laid-Open No. 11-123399, sludge is pressurized to 10 MPa or more and heated to less than 350° C., and thereafter is lead to a magnetic powder separator. According to Japanese Patent Application Laid-Open No. 11-207399, sludge is pressurized to approximately 2 MPa and heated to around 200° C., and thereafter is lead to a magnetic powder separator.

SUMMARY OF THE INVENTION

The present invention has been made in consideration of the foregoing circumstances, and an object of the invention is to provide a wastewater treatment apparatus that can decrease the amount of energy required for decomposing recovered magnetic flocs, and can also recover magnetic powder from recovered magnetic flocs with high efficiency with a simple apparatus configuration.

To achieve the above object, the present invention provides a wastewater treatment apparatus that obtains treated water by adding a flocculant and magnetic powder to wastewater accumulated in a tank to thereby generate flocculated magnetic flocs, and recovering the magnetic flocs by means of a magnetic force to thereby remove the magnetic flocs from the wastewater, the wastewater treatment apparatus including a magnetic flocs treatment device which treats the recovered magnetic flocs and which has a high pressure pump and a magnetic separation portion; wherein the magnetic separation portion has a structure in which fluid piping is arranged at a magnetic field generating portion, and magnetic powder in the magnetic flocs is recovered by using the high pressure pump to pump the recovered magnetic flocs to the fluid piping of the magnetic separation portion, and causing the magnetic powder in the magnetic flocs to attach to the fluid piping by means of a magnetic force of the magnetic field generating portion.

According to the present invention, water including recovered magnetic flocs is pressurized to a predetermined pressure by a high pressure pump, and the water is pumped to fluid piping of a magnetic separation portion. A shear force is applied to the magnetic flocs by the pumping action, and as a result of the shear force the magnetic flocs are converted into water in which the magnetic powder and suspended solid matter that had been flocculated up to that time are separated into individual pieces. Subsequently, when the water passes through the fluid piping, the separated magnetic powder is caused to attach to the fluid piping by a magnetic force of the magnetic field generating portion and recovered. Thus, according to the present invention, it is possible to decrease the amount of energy required to decompose recovered magnetic flocs, and magnetic powder can be recovered at a high efficiency from recovered magnetic flocs using a simple apparatus configuration that comprises a high pressure pump and a magnetic separation portion.

Preferably, the present invention includes a conduit that returns magnetic powder recovered with the fluid piping to the tank.

According to the present invention, since recovered magnetic powder can be reused, a wastewater treatment apparatus can be provided that reduces waste matter and running costs.

Preferably, in the present invention, the magnetic field generating portion includes a magnetic drum that has a plurality of electromagnets or permanent magnets mounted in a vicinity of a surface of the magnetic drum, and a cylindrical pipe made of metal that surrounds the drum, wherein the fluid piping is wound around the circumference of the cylindrical pipe.

According to the present invention, since the length of the fluid piping can be made sufficiently long by winding the fluid piping around the magnetic drum, the magnetic powder can undergo adequate magnetic separation. Further, although a problem of pressure loss in fluid piping may occur when the fluid piping has a small diameter and a long length, since the present structure uses a pump that originally has a sufficiently high pressure, the aforementioned problem of a pressure loss does not arise.

In the present invention, preferably the magnetic drum is capable of a reciprocating action within the cylindrical pipe, a plurality of systems of the fluid piping are provided at one magnetic field generating portion to which the magnetic drum moves, and the wastewater treatment apparatus has a switching valve that causes magnetic flocs to flow into the plurality of systems of fluid piping.

According to the present invention, a flow channel is switched by means of a switching valve to cause magnetic flocs to flow to one fluid piping system among a plurality of systems of fluid piping. At this time, the magnetic drum is moved inside the cylindrical pipe so as to be positioned at one magnetic field generating portion that corresponds to the one fluid piping system, and another fluid piping system is cleaned. Subsequently, when cleaning of the other fluid piping system ends, the flow channel is switched by the switching valve to cause magnetic flocs to flow to the other fluid piping system. At this time, the magnetic drum is moved inside the cylindrical pipe so as to be positioned at another magnetic field generating portion that corresponds to the other fluid piping system, and the one fluid piping system is cleaned. It is thus possible to continuously operate the wastewater treatment apparatus. Further, since a magnetic force generated by the magnetic drum is not acting on a fluid piping system when the fluid piping in question is being cleaned, magnetic powder that has attached to the fluid piping can be easily detached by the cleaning water. The detached magnetic powder is returned to a tank through a conduit together with the cleaning water and reused.

In the present invention, preferably, in the fluid piping, a magnetic flocs supply channel and a cleaning water supply channel are linked through a switching valve, and the switching valve is positioned on an upstream side of a pressure reducing device that is disposed between the high pressure pump and the fluid piping.

According to the present invention, by disposing a pressure reducing device at a stage subsequent to the high pressure pump, a shear force applied to the magnetic flocs can be applied to the magnetic flocs at a stage prior to the fluid piping. By providing a pressure reducing device, recovery of magnetic powder is performed with even greater efficiency. By arranging a switching valve that switches between a magnetic flocs supply channel and a cleaning water supply channel on the upstream side of the pressure reducing device, it is possible to clean the pressure reducing device with the cleaning water. As a result, the durability of the pressure reducing device is enhanced and the performance of the pressure reducing device can be maintained.

In the present invention, preferably the magnetic flocs treatment device includes a pH adjustment device, and after the magnetic flocs are adjusted to a pH between 8 and 14 by the pH adjustment device, the magnetic flocs are pumped by the high pressure pump, and magnetic powder is recovered by the magnetic separation portion.

According to the present invention, by making the pH of magnetic flocs between 8 and 14 by means of a pH adjustment device that is disposed at a stage prior to the high pressure pump, it is possible to increase the efficiency of decomposing the magnetic flocs by a magnetic flocs treatment device that is provided at a subsequent stage.

In the present invention, preferably the magnetic flocs treatment device includes a heating device, and after the magnetic flocs are heated to a temperature between 40 and 100° C. by the heating device, the magnetic flocs are pumped by the high pressure pump, and magnetic powder is recovered by the magnetic separation portion.

According to the present invention, by heating magnetic flocs to a temperature between 40 and 100° C. by means of a heating device that is disposed at a stage prior to the high pressure pump, it is possible to increase the efficiency of decomposing the magnetic flocs by a magnetic flocs treatment device that is provided at a subsequent stage.

In the present invention, preferably the magnetic flocs treatment device includes an electrolysis device, and after the magnetic flocs are subjected to an electrolysis reaction by the electrolysis device, the magnetic flocs are pumped by the high pressure pump, and magnetic powder is recovered by the magnetic separation portion.

According to the present invention, when magnetic flocs are electrolyzed by an electrolysis device disposed at a stage prior to the high pressure pump, in a case in which water to be treated includes salt content such as NaCl, the pH is shifted to the alkali side by the electrolysis, and energy generated by the electrolysis is ultimately imparted to the flocs in the form of heat, so that the temperature also increases. More specifically, since alkalization and an increased temperature can be achieved just by electrolysis, floc decomposition by the magnetic flocs treatment device at a subsequent stage is facilitated.

According to the present invention, it is possible to decrease the amount of energy required to decompose recovered magnetic flocs and recover magnetic powder at a high efficiency from recovered magnetic flocs with a simple apparatus configuration. Further, according to the present invention, since recovered magnetic powder can be reused, a wastewater treatment apparatus can be provided that reduces waste matter and running costs.

DETAILED DESCRIPTION OF THE PREFERRED EMBODIMENTS

Preferred embodiments of the wastewater treatment apparatus according to the present invention are described hereunder in accordance with the attached drawings.

Figure 1:
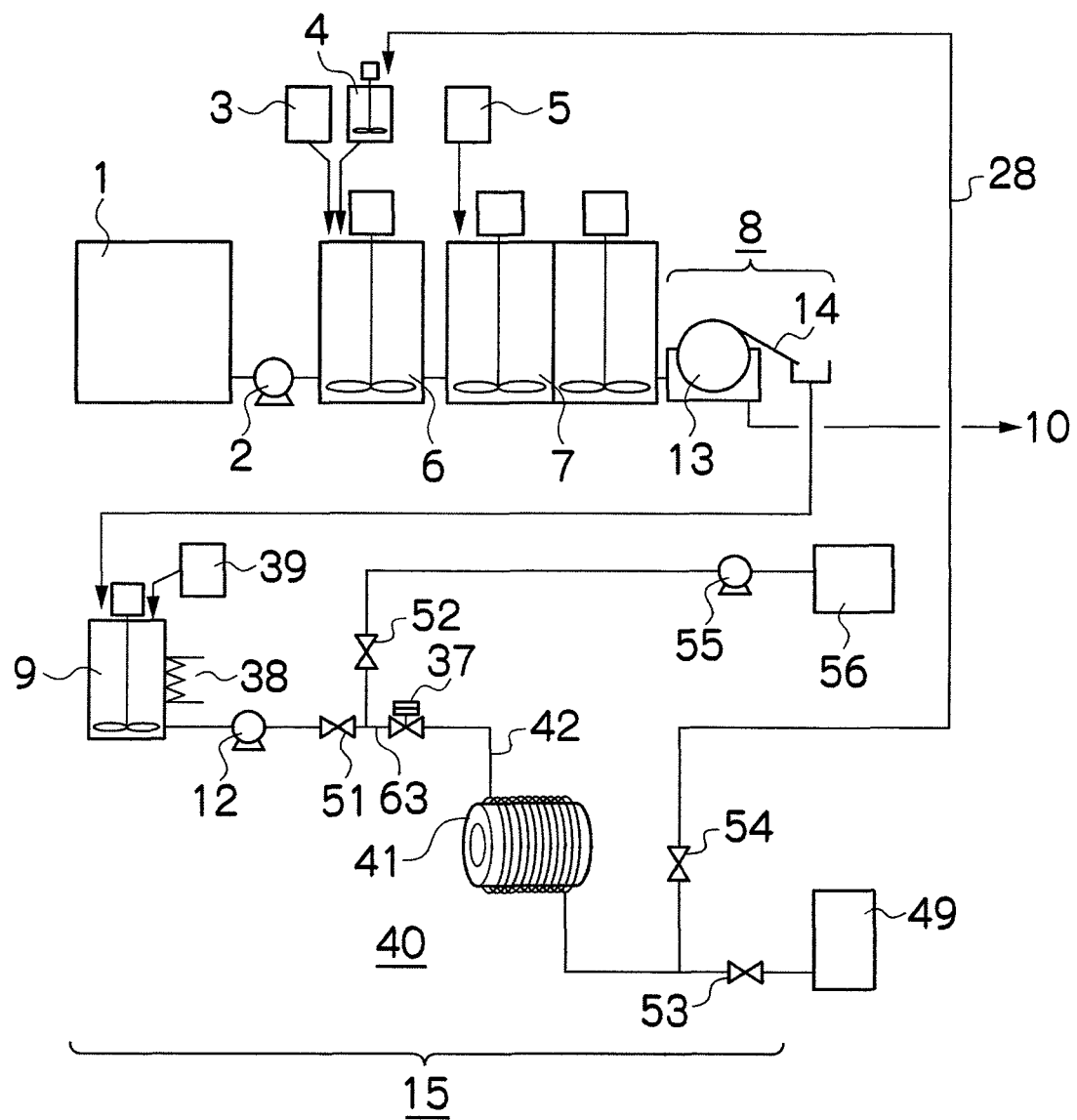
FIG. 1 is a structural drawing that illustrates a wastewater treatment apparatus according to a first embodiment of the present invention.

FIG. 1 is a structural drawing that illustrates a wastewater treatment apparatus according to a first embodiment of the present invention.

Wastewater (wastewater that includes small pieces of suspended matter or emulsified oil particles) that is water to be treated is pumped from a raw water tank 1 by a raw water pump 2 to a rapid agitation tank 6 of the wastewater treatment apparatus. At this time, the wastewater is accumulated in the rapid agitation tank 6. An inorganic flocculant such as, for example, PAC (polyaluminum chloride), ferric sulfate, or aluminum sulfate is added to the rapid agitation tank 6 from an inorganic flocculant tank 3 using an inorganic flocculant injection pump (not shown), and the resulting mixture is rapidly agitated. At this time, a large number of small lumps referred to as "microflocs" are formed by the effect of the flocculant as the collision frequency of the suspended matter and oil particles is increased by the rapid agitation. While the mixture is inside the rapid agitation tank 6, or when the mixtures leaves the rapid agitation tank 6, magnetic powder such as magnetite is added thereto from the magnetic powder tank 4 by a magnetic powder injection pump (not shown).

After the water to be treated that includes microflocs has left the rapid agitation tank 6, the water to be treated flows into a slow agitation tank 7. At this time, polymeric flocculants are added thereto from a polymeric flocculant tank 5 by means of a polymeric flocculant pump (not shown). By slowly agitating the resulting mixture in the slow agitation tank 7, flocculated magnetic flocs develop. In this case, an anionic polymer is desirable as the polymeric flocculant. For example, polyacrylamide is suitable as the polymeric flocculant. When polyacrylamide is used, a structure may be considered in which the polyacrylamide is stored as powder and added to the polymeric flocculant tank 5 in fixed quantities with a feeder and agitated. Although an example is described above which uses an inorganic flocculant and an anionic polymeric flocculant, an effect similar to the effect described hereunder is also obtained in the case of using only a cationic polymeric flocculant without using an inorganic flocculant.

The magnetic flocs generated as described above are conveyed with the water to a magnetic separation portion 8.

A magnetic drum 13 that contains therein a permanent magnet such as a neodymium magnet is arranged in the magnetic separation portion 8. When flocculated water that contains the magnetic flocs passes the vicinity of the magnetic drum 13, magnetic powder contained in the magnetic flocs is attracted by the magnetic force of the permanent magnet and attaches to the surface of the magnetic drum 13. The magnetic flocs that attach to the surface of the magnetic drum 13 are lifted from the water to the air accompanying rotation of the magnetic drum 13, and are scraped off by a scraper 14 and recovered. The magnetic flocs that are recovered (hereunder, referred to as "recovered flocs") are fed to a recovered flocs decomposing apparatus (magnetic flocs treatment device) 15. Further, the water from which magnetic flocs have been removed is discharged to outside from the magnetic separation portion 8 as treated water 10.

The recovered flocs are temporarily accumulated in a recovered flocs tank 9. An agitator is provided in the recovered flocs tank 9. Precipitation of the recovered flocs is prevented by agitating the contents inside the tank 9 using the agitator.

Water including the recovered flocs of the recovered flocs tank 9 is pressurized to between 0.2 to 5 MPa approximately by a high pressure pump 12 such as a plunger type pump or a diaphragm type pump. Thereafter, the water is depressurized by a pressure reducing device 37 with a flow channel that has a narrow portion. When the recovered flocs pass through the pressure reducing device 37, the flow rate quickens at the narrow portion of the flow channel of the pressure reducing device 37, and the recovered flocs are decomposed by an increase in the shear stress. In this connection, the pressure reducing device 37 is not essential, and since a shear force can also be applied to the recovered flocs by directly pumping water that has been pressurized by the high pressure pump 12 to fluid piping 42 that is described later, magnetic powder 64 can be separated from the recovered flocs and the separated magnetic powder 64 can be recovered with the fluid piping 42.

Figure 2:
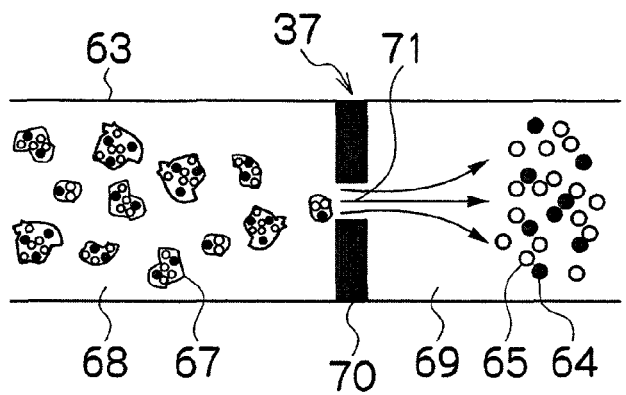
FIG. 2 is an explanatory drawing that illustrates an example of the configuration of a pressure reducing device.

An example of the pressure reducing device 37 is shown in FIG. 2. This is an example in which an orifice 70 is provided in piping 63 that links the high pressure pump 12 and the pressure reducing device 37 shown in FIG. 1.

According to this pressure reducing device 37, when a water current 68 of water including a large number of recovered flocs 67 is passing through the orifice 70, the flow rate quickens when the water current 68 passes through a narrow opening 71 in the flow channel. The recovered flocs 67 are decomposed by an increase in the shear stress caused by the increased flow rate. As a result, a water current 69 is formed in which magnetic powder 64 and suspended solid matter 65 and the like that had been flocculated up to this time are separated into individual pieces. Accordingly, by providing a device that has a magnetic separation function at the stage subsequent thereto, it is possible to recover the magnetic powder (magnetic particles) 64 from the recovered flocs 67.

As well as the orifice 70, a nozzle, or a back-pressure valve for which the pressure can be controlled or the like may be considered as the pressure reducing device 37. In this case, the apparatus can be provided with excellent durability properties by using a diamond or ceramic material as the material of the portion at which the flow channel narrows. Further, if the portion at which the flow channel narrows is made in the shape of an orifice with a plurality of holes, the operations will not be obstructed even if one hole is blocked. The pressure reducing device 37 may also be a combination of an orifice that has a portion at which the flow channel narrows and a back-pressure valve for which the pressure can be controlled. In this case, exact pressure control can be performed in a state in which the durability of the back-pressure valve is ensured.

However, once flocs have been decomposed the flocs will coagulate again if the flocs are left as they are. It is therefore necessary to recover only the magnetic powder 64 from flocs that are decomposed (hereunder, referred to as "decomposed flocs") immediately after the pressure reducing device 37.

Consequently, according to the first embodiment, as shown in FIG. 1, the magnetic powder 64 is recovered by a magnetic powder recovery and magnetic separation portion (magnetic separation portion) 40. The magnetic powder recovery and magnetic separation portion 40 is provided with a cylindrical electromagnet (magnetic field generating portion) 41, and fluid piping 42 which is arranged around the circumference of the electromagnet 41 and through which decomposed flocs flows.

By employing this structure, the flow of decomposed flocs that flows through the fluid piping 42 can be placed in a state with a greater turbulence than the slow agitation tank 7 by decreasing the diameter of the fluid piping 42 to some extent. It is thereby possible to implement magnetic separation in a state in which decomposed flocs do not redevelop into flocculated flocs. The high pressure pump 12, the pressure reducing device 37, and the magnetic powder recovery and magnetic separation portion 40 are included in the recovered flocs decomposing apparatus 15. As described in the foregoing, the pressure reducing device 37 is not essential.

While the decomposed flocs flow through the fluid piping 42, only the magnetic powder 64 is attracted by the electromagnet 41 and builds up on a wall surface of the fluid piping 42 close to the electromagnet 41. The other substances are discharged to a sludge tank 49 outside the magnetic powder recovery and magnetic separation portion 40 together with the flow of water. In this case, if the flow rate in the fluid piping 42 is fast, there is the possibility that the magnetic powder 64 that has built up will be detached and flow through the fluid piping 42 again.

Therefore, according to the present structure, since the length of the fluid piping 42 is made sufficiently long by winding the fluid piping 42 around the electromagnet 41, it is possible to adequately perform magnetic separation of the magnetic powder 64 using the optimal design. Further, although in some cases a problem of a pressure loss in the fluid piping 42 may arise when the diameter of the fluid piping 42 is reduced and the length thereof is lengthened, since the present structure is one that uses the high pressure pump 12 that originally has sufficient pressure, the above described problem regarding a pressure loss does not arise.

After a certain amount of time elapses, valves 51 and 53 shown in FIG. 1 are closed and valves 52 and 54 are opened, thereby allowing cleaning water to flow through the fluid piping 42 from the water tank 56 using a cleaning water pump 55. At the same time, the passage of an electric current to the electromagnet 41 is stopped to break the magnetic field of the electromagnet 41. As a result, the fluid piping 42 can be cleaned and reused, and at the same time the magnetic powder 64 can be recovered and returned to the magnetic powder tank 4 through the conduit 28.

In this case, by positioning the valve (switching valve) 52 into which the cleaning water flows on the upstream side of the pressure reducing device 37, the inside of the pressure reducing device 37 can also be cleaned at regular intervals. Hence, the durability of the pressure reducing device 37 can be enhanced, and the pressure reducing capacity thereof can be maintained. Some of the treated water 10 may also be used as the water of the water tank 56.

The recovered flocs tank 9 is provided with, for example, a pH adjustment device 39 that has a pH meter, a tank for alkali such as NaOH, and an injection pump therefor. The efficiency with which the recovered flocs decomposing apparatus 15 decomposes recovered flocs at a subsequent stage can be increased by making the pH of the recovered flocs between 8 and 14. This is because flocculants exist for which a flocculation effect is normally highest in the vicinity of pH=7, which is neutral, and the flocculation effect deteriorates when the ph region is shifted away from a region with a high flocculation effect.

Similarly, although flocs inside the recovered flocs tank 9 may be used as they are, it is preferable to heat the recovered flocs to a temperature between 40 and 100° C. using a heater 38 because the efficiency with which the recovered flocs decomposing apparatus 15 decomposes recovered flocs at a subsequent stage can be increased. At this time, if the region from the recovered flocs tank 9 to the pressure reducing device 37 is thermally insulated using a thermal insulating material, only a small amount of energy will be required for heating.

It is also possible to improve the decomposition efficiency by employing a combination of both heating to a high temperature and alkalization as described above. Furthermore, it is possible to improve the decomposition efficiency by also increasing the temperature by heating with a heater or the like downstream of the high pressure pump 12.

Figure 3:
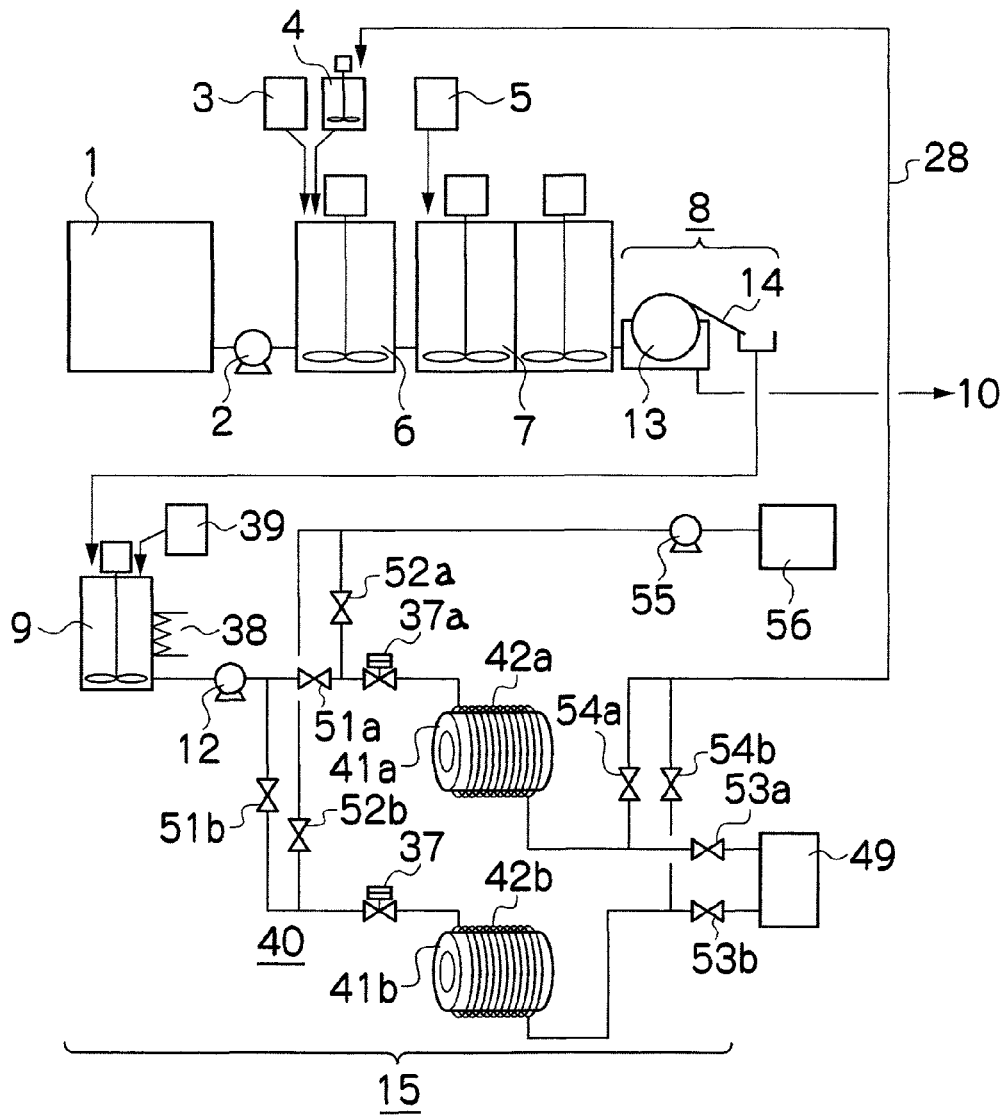
FIG. 3 is a structural drawing that illustrates a wastewater treatment apparatus according to a second embodiment of the present invention.

FIG. 3 is a structural drawing that illustrates a wastewater treatment apparatus according to a second embodiment of the present invention.

In the second embodiment, two of the magnetic powder recovery and magnetic separation portions 40 of the first embodiment illustrated in FIG. 1 are provided in parallel to each other. According to this structure, continuous operation is enabled by causing the magnetic powder recovery and magnetic separation portions 40 perform a magnetic separation operation and a cleaning operation alternately. Naturally, a similar advantage can be obtained when three or more of the magnetic powder recovery and magnetic separation portions 40 are provided. In this connection, members of the second embodiment that are identical or similar to members of the first embodiment are designated by the same reference numerals, and a description of those members is omitted herein.

Figure 4:
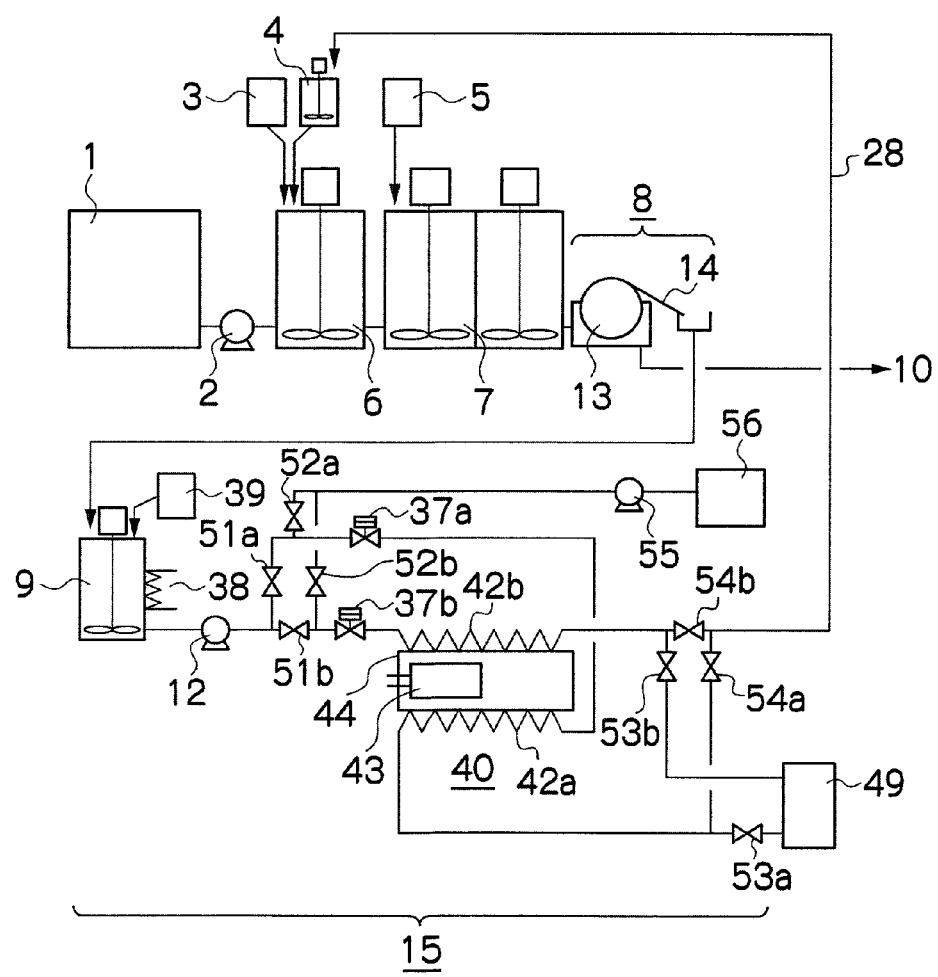
FIG. 4 is a structural drawing that illustrates a wastewater treatment apparatus according to a third embodiment of the present invention.

FIG. 4 is a structural drawing that illustrates a wastewater treatment apparatus according to a third embodiment of the present invention.

A difference between the third embodiment and the first and second embodiments shown in FIG. 1 and FIG. 3 is that permanent magnets are utilized in the magnetic powder recovery and magnetic separation portion 40. In this connection, members of the third embodiment that are identical or similar to members of the first embodiment are designated by the same reference numerals, and a description of those members is omitted herein.

Figure 5:
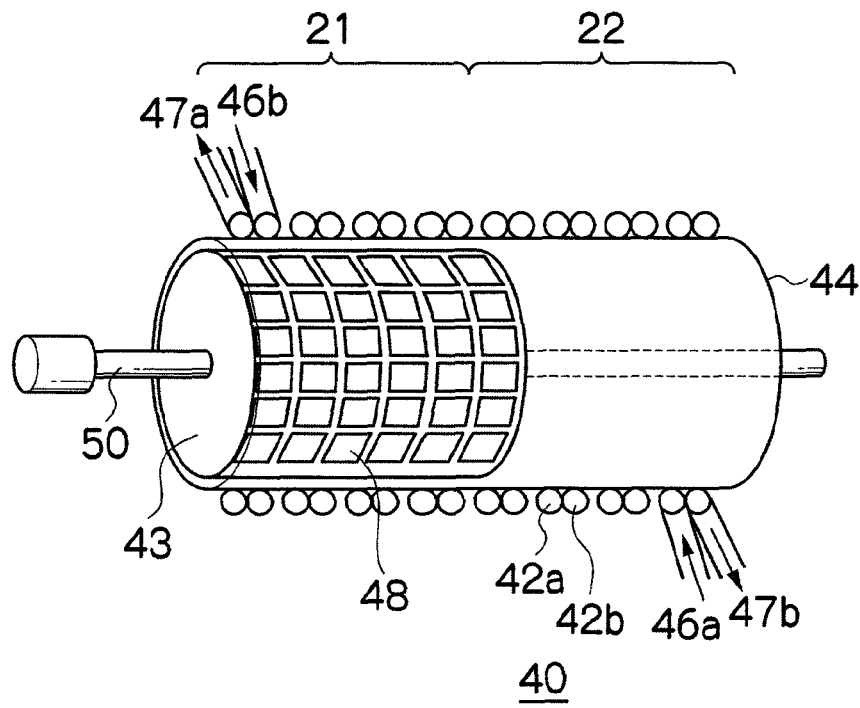
FIG. 5 is an explanatory drawing that illustrates a structure of a magnetic powder recovery and magnetic separation portion.

FIG. 5 shows the structure of the magnetic powder recovery and magnetic separation portion 40 that utilizes permanent magnets. A cylindrical magnetic drum 43 has a structure in which a large number of permanent magnets 48 are mounted in the vicinity of the surface thereof. If the array of magnets is arranged in advance so that the magnetic poles of adjacent magnets are heteropolar, since a large magnetic gradient arises only in the vicinity of the magnetic drum 43, a large magnetic force can be obtained and the magnetic field does not adversely affect other apparatuses that are arranged at positions away from the magnetic drum 43. This structure is thus suitable for recovering and separating magnetic powder.

The magnetic drum 43 is housed in a slidable state inside a metal cylinder 44, and is driven by a driving apparatus 50 to perform a reciprocating action inside the cylinder 44. Fluid piping 42*a* and 42*b* are wound around the outside of the cylinder 44 in a double helix configuration.

For example, when the magnetic drum 43 is located at a position designated by reference numeral 21 inside the cylinder 44, decomposed flocs flow through the fluid piping 42*a* from an inflow port 46*a* towards an outflow port 47*a*. In contrast, when the magnetic drum 43 moves to a position designated by reference numeral 22, a switching valve of the fluid piping is switched and decomposed flocs flow through the fluid piping 42*b* from an inflow port 46*b* towards an outflow port 47*b*. At the same time, cleaning water flows through the fluid piping 42*a* from the inflow port 46*a* towards the outflow port 47*a*. According to this structure, it is possible to continuously and efficiently perform magnetic separation operations to recover magnetic powder without leaking magnetic powder. In this connection, although two systems of fluid piping, i.e. 42*a* and 42*b*, are described in this example, the number thereof is not limited to two, and three or more systems of fluid piping may be provided. In such case, the number of movement positions of the magnetic drum 43 inside the cylinder 44 will be three or more.

Figure 6:
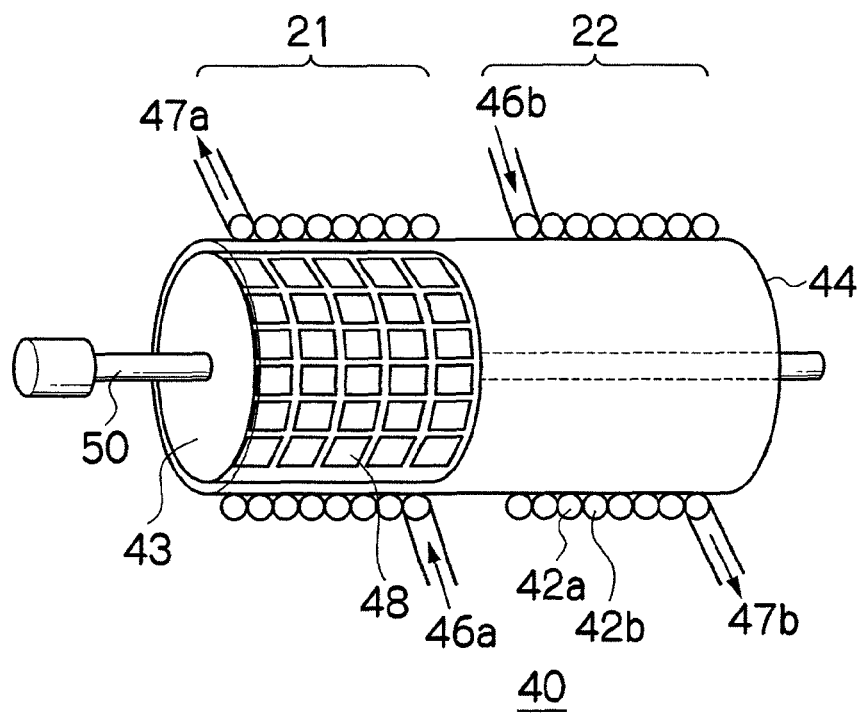
FIG. 6 is an explanatory drawing that illustrates another structure of a magnetic powder recovery and magnetic separation portion.

FIG. 6 shows another structural example of the magnetic powder recovery and magnetic separation portion 40 that utilizes permanent magnets.

Although the structure of the magnetic drum 43 shown in FIG. 6 is the same as that of the embodiment shown in FIG. 5, the arrangement of the fluid piping 42*a* and 42*b* is different to the embodiment shown in FIG. 5. According to the structure shown in FIG. 6, for example, when the magnetic drum 43 is at a position designated by reference numeral 21 inside the cylinder 44, decomposed flocs flow through the fluid piping 42*a* from the inflow port 46*a* towards the outflow port 47*a*. In contrast, when the magnetic drum 43 moves to a position designated by reference numeral 22, a switching valve of the fluid piping is switched and decomposed flocs flow through the fluid piping 42*b* from an inflow port 46*b* towards an outflow port 47*b*. At the same time, cleaning water flows through the fluid piping 42*a* from the inflow port 46*a* towards the outflow port 47*a*. According to the present structure, it is possible to continuously and efficiently perform magnetic separation operations to recover magnetic powder without leaking magnetic powder. In this case, by providing a small clearance between the regions designated by reference numerals 21 and 22, it is possible to lessen the influence of the magnetic field of the adjacent region during the cleaning process.

Figure 7:
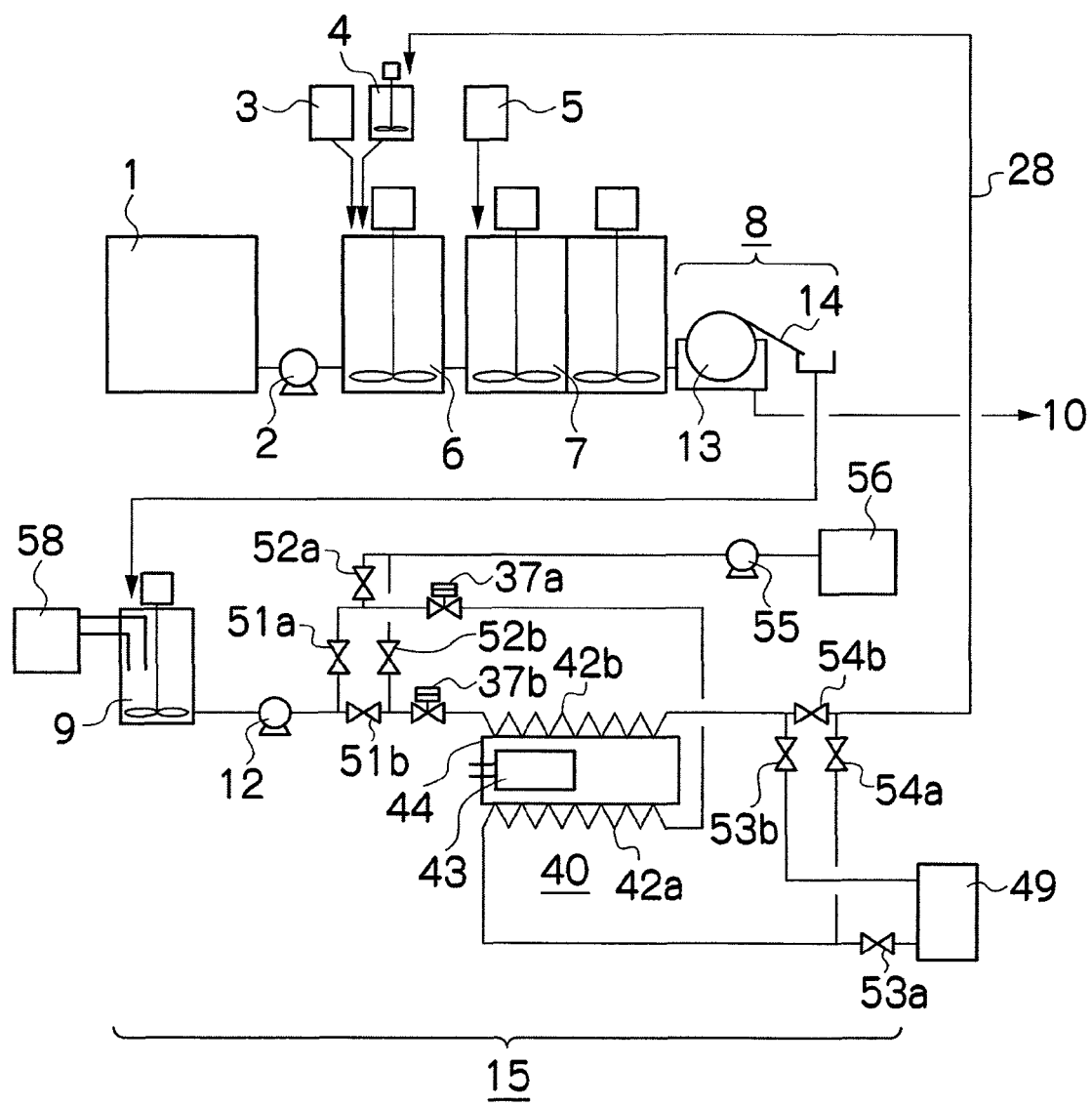
FIG. 7 is a structural drawing that illustrates a wastewater treatment apparatus according to a fourth embodiment of the present invention.

FIG. 7 is a structural drawing that illustrates a wastewater treatment apparatus according to a fourth embodiment.

Although the fourth embodiment illustrates an example using the magnetic powder recovery and magnetic separation portion that uses permanent magnets as illustrated in FIG. 3, the same advantages are obtained as in the case of using an electromagnet as illustrated in FIG. 1. In this connection, members of the fourth embodiment that are identical or similar to members of the first embodiment are designated by the same reference numerals, and a description of those members is omitted herein.

According to the fourth embodiment, an electrolysis device 58 is provided in the recovered flocs tank 9 instead of the pH adjustment device and heating device that are used in the example illustrated in FIG. 1 and FIG. 2.

When flocs in the recovered flocs tank 9 are electrolyzed by the electrolysis device 58, if the water to be treated includes salt content such as NaCl the pH is shifted to the alkali side by the electrolysis, and energy produced by the electrolysis is ultimately applied to the flocs in the form of heat, so that the temperature also increases. More specifically, alkalization and a temperature increase can be achieved just by electrolysis, and this has the advantage of facilitating decomposition of recovered flocs by the recovered flocs decomposing apparatus 15 at a subsequent stage.

What is claimed is:

1. A wastewater treatment apparatus that obtains treated water by adding a flocculant and magnetic powder to wastewater accumulated in a tank to thereby generate flocculated magnetic flocs, and recovering the magnetic flocs by means of a magnetic force to thereby remove the magnetic flocs from the wastewater, comprising:
   a magnetic flocs treatment device which treats the recovered magnetic flocs and which comprises a pump and a magnetic separation portion;
   wherein the magnetic separation portion has a structure in which fluid piping is arranged at a magnetic field generating portion comprising a magnetic member that has a plurality of electromagnets or permanent magnets mounted in a vicinity of a surface of the magnetic member, and a hollow pipe made of metal that surrounds the member, wherein the fluid piping is wound around the circumference of the hollow pipe, and magnetic powder in the recovered magnetic flocs is recovered by using the pump to pump the recovered magnetic flocs to the fluid piping of the magnetic separation portion, and causing the magnetic powder in the recovered magnetic flocs to attach to the fluid piping by means of a magnetic force of the magnetic field generating portion.

2. The wastewater treatment apparatus according to claim 1, comprising a conduit between the fluid piping of the magnetic separation portion and the tank that returns magnetic powder recovered with the fluid piping to the tank.

3. The wastewater treatment apparatus according to claim 1, wherein the magnetic member is capable of a reciprocating action within the hollow pipe, a plurality of systems of the fluid piping are provided at one magnetic field generating portion to which the magnetic member moves, and the wastewater treatment apparatus has a switching valve that causes magnetic flocs to flow into the plurality of systems of fluid piping.

4. The wastewater treatment apparatus according to claim 3, wherein, in the fluid piping, a magnetic flocs supply channel and a cleaning water supply channel are linked through a switching valve, and the switching valve is positioned on an upstream side of a pressure reducing device that is disposed between the pump and the fluid piping.

5. The wastewater treatment apparatus according to claim 1, wherein the magnetic flocs treatment device includes a pH adjustment device, and after the recovered magnetic flocs are adjusted to a pH between 8 and 14 by the pH adjustment device, the recovered magnetic flocs are pumped by the pump, and magnetic powder is recovered by the magnetic separation portion.

6. The wastewater treatment apparatus according to claim 1, wherein the magnetic flocs treatment device includes a heating device, and after the recovered magnetic flocs are heated to a temperature between 40 and 100° C. by the heating device, the recovered magnetic flocs are pumped by the pump, and magnetic powder is recovered by the magnetic separation portion.

7. The wastewater treatment apparatus according to claim 1, wherein the magnetic flocs treatment device includes an electrolysis device, and after the recovered magnetic flocs are subjected to an electrolysis reaction by the electrolysis device, the recovered magnetic flocs are pumped by the pump, and magnetic powder is recovered by the magnetic separation portion.

8. A wastewater treatment apparatus, comprising:
   a tank for accumulating wastewater and for mixing the wastewater with at least one flocculant;
   an addition device that adds a material comprising magnetic powder to the wastewater to thereby generate flocculated magnetic flocs;
   a magnetic flocs treatment device which treats recovered magnetic flocs recovered from the wastewater and which comprises a pump and a magnetic separation portion;
   wherein the magnetic separation portion has a structure in which fluid piping is arranged at a magnetic field generating portion comprising a magnetic member that has a plurality of electromagnets or permanent magnets mounted in a vicinity of a surface of the magnetic member, and a hollow pipe made of metal that surrounds the member, wherein the fluid piping is wound around the circumference of the hollow pipe, and magnetic powder in the recovered magnetic flocs is recovered by using the pump to pump the recovered magnetic flocs to the fluid piping of the magnetic separation portion, and causing the magnetic powder in the recovered magnetic flocs to attach to the fluid piping by means of a magnetic force of the magnetic field generating portion; and
   a conduit between the fluid piping of the magnetic separation portion and the tank that returns magnetic powder recovered with the fluid piping to the tank.

* * * * *